United States Patent [19]

Shekleton

[11] Patent Number: 4,478,045

[45] Date of Patent: Oct. 23, 1984

[54] COMBUSTORS AND GAS TURBINE ENGINES EMPLOYING SAME

[75] Inventor: Jack Shekleton, San Diego, Calif.

[73] Assignee: Solar Turbines Incorporated, San Diego, Calif.

[21] Appl. No.: 352,531

[22] Filed: Feb. 26, 1982

Related U.S. Application Data

[63] Continuation-in-part of Ser. No. 128,199, Mar. 7, 1980, Pat. No. 4,343,147.

[51] Int. Cl.[3] .......................... F02C 7/22; F23R 3/20

[52] U.S. Cl. ....................................... 60/737; 60/743; 60/744; 60/750

[58] Field of Search .................... 60/39.06, 39.11, 737, 60/743, 744, 745, 748, 749, 750

[56] References Cited

U.S. PATENT DOCUMENTS

| | | | |
|---|---|---|---|
| 2,214,568 | 9/1940 | Thomas | 431/264 |
| 2,374,569 | 4/1945 | Tramontini | 431/89 |
| 2,416,389 | 2/1947 | Heppner et al. | 60/745 |
| 3,287,904 | 11/1966 | Warren et al. | 60/744 |
| 3,840,328 | 10/1974 | Ashton | 431/168 |
| 3,919,988 | 11/1975 | Bun | 123/25 B |
| 3,933,133 | 1/1976 | Shekleton | 60/743 |
| 4,045,159 | 8/1977 | Nishi et al. | 60/744 |
| 4,054,028 | 10/1977 | Kawaguchi | 60/748 |
| 4,204,485 | 5/1980 | Perepolkin | 123/25 B |

*Primary Examiner*—Carlton R. Croyle
*Assistant Examiner*—Timothy S. Thorpe
*Attorney, Agent, or Firm*—LeBlanc, Nolan, Shur & Nies

[57] ABSTRACT

Combustors [22] which employ such features as rotary cup fuel atomizers and the latter in conjuction with CIVIC combustion to enhance flame performance, to produce efficient combustion over a wide operating range, and to eliminate the problems typically encountered in liquid fueled combustors, especially as they are scaled down in size. A porous or perforate barrier [180] can be used to keep large fuel drops from reaching the combustion zone [124] of the combustor. Also, an air buffer system can be employed to keep fuel from backing up to the bearings [32] by which the rotary cup [98] of the atomizer is rotatably supported, and a fuel supply line [56] with a strategically located orifice [176] can be provided to effect an interaction between fuel discharged therefrom and the buffer air. This keeps the film of fuel formed on the atomizer cup [98] from being disrupted and also keeps the buffer air from penetrating to an inner hot gas recirculation zone [130] in the combustor. The foregoing are undesirable as they cause flame instability and the generation of smoke.

13 Claims, 3 Drawing Figures

COMBUSTORS AND GAS TURBINE ENGINES EMPLOYING SAME

RELATION TO OTHER APPLICATIONS

This application is a continuation-in-part of application Ser. No. 128,199 filed Mar. 7, 1980 (now U.S. Pat. No. 4,343,147 issued Aug. 10, 1982).

TECHNICAL FIELD OF THE INVENTION

The present invention relates to combustors and, more particularly, to combustors having novel, improved combustor fuel supply systems with rotary cup atomizers.

It is difficult to obtain good combustion, reliably, and reasonable cost, in small, liquid fuel combustors. This is because it is not possible, employing heretofore available techniques, to downscale fuel droplet size to match the combustor size.

Instead, atomization of liquid fuels at the low flows which small combustors employ ordinarily results in larger fuel droplets and lower efficiencies. Also, the smaller fuel passages involved increase the probability of plugging and generate higher fuel pressures, shortening the life of fuel pumps, for example, and increasing service costs.

I pointed out in parent application Ser. No. 128,199 that the foregoing, and other, drawbacks of small liquid fuel combustors can be avoided, and other advantages obtained, by employing a fuel supply system including a rotating cup atomizer of the novel design disclosed in the parent application, preferably in conjunction with CIVIC combustion and/or other features dealt with in that application.

The employment of a rotating cup atomizer in a small liquid fueled combustor is advantageous because it eliminates the small passages of typical liquid fuel supply systems, and the fuel pressure can be very low as it is needed only to effect flow to the combustor.

Fuel can be readily atomized into small droplets of controlled size even at extremely low flow rates and in such circumstances even if the fuel is highly viscous. This is important because of the increased range of fuels that can be employed and because it permits the combustor to operate efficiently even under Arctic and other cold weather conditions.

One salient feature of the fuel supply and rotating cup atomizing systems disclosed in parent application Ser. No. 128,199 is a novel buffer system which equalizes the pressure between the interior of the combustor and that on the upstream side of the fuel atomizer. This is important in that it keeps fuel from moving backward into the bearings of the rotary cup drive mechanism and consequently eliminates the deterioration which the association of fuel with the bearings causes.

DISCLOSURE OF THE INVENTION

I have since found that, in certain gas turbine engine applications of my earlier disclosed combustors, the flow of air in the buffer system can, at the highest flow rates under normal operating conditions, disturb the film of liquid fuel formed on the rotary cup of the liquid fuel atomizer and, also, enter the inner recirculation zone of the combustor. Disturbance of the fuel film is undesirable because that causes engine instability and surge. Entrance of the buffer air into the inner recirculation zone of the combustor is also undesirable; that causes such deleterious effects as flame instability and smoke.

Now, I have found that the above-discussed tendency toward disturbance of the liquid fuel film can be minimized by discharging the fuel from the line supplying the atomizer at low velocity through an orifice in that line into the air flowing through the buffer system toward the rotary cup of the atomizer and the combustion zone. This reduces the velocity of that air and, consequentially, its tendency to disturb the film of fuel formed on the atomizer cup and the ability of that air to penetrate to the combustion zone of the combustor.

That disturbance of the liquid fuel film formed on the rotary cup causes engine instability and surge is because fuel droplets are torn off the film at an uncontrolled frequency. These droplets create significant variations in the fuel supply rate as they enter the combustion zone of the combustor. I have now discovered that this unwanted state of operation can be avoided by placing a perforate or porous barrier in the rotary cup of the atomizer to intercept such droplets of liquid fuel as may be separated from the liquid fuel film. This barrier consequentially minimizes the problems associated with the disturbance of the fuel film; at the same time it allows air to flow freely, permitting the buffer system to continue functioning as intended.

The beneficial effects of the novel combustor features discussed above are to a large part independently obtained. However, maximum improvements in performance are obtained by the combination of those features which is accordingly preferred.

OBJECTS OF THE INVENTION

It will be apparent to the reader from the foregoing that one important object of the present invention resides in the provision of novel, improved, liquid fueled combustors.

Other important but more specific objects of my invention reside in the provision of combustors in accord with the preceding object:

- which provide improved resistance to engine instability and surge in gas turbine engine applications;
- which are less apt to generate smoke and less susceptible to flame instability than heretofore available state of the art combustors of comparable character.

Still another important and primary object of the present invention is the provision of novel, improved, rotary cup fuel supply and atomization systems for liquid fueled combustors.

Other important, more specific objects of my invention reside in the provision of rotary cup type fuel supply and atomizer systems in accord with the preceding object:

- which are capable of producing the advantages discussed above;
- which employ a novel porous or perforate barrier arrangement to keep large fuel droplets from reaching the combustion zone of the combustor and causing such unwanted effects as flame instability and the generation of smoke;
- which employ a novel fuel delivery arrangement that: minimizes disturbance of the liquid fuel film formed on the rotary cup atomizer, thus minimizing engine instability and surge in turbine engine applications, and, at the same time, accommodates protection against fuel back-up and the deleterious effects this can cause.

Still other important objects and features and additional advantages of my invention will become apparent to the reader from the appended claims and as the ensuing detailed description and discussion proceeds in conjunction with the accompanying drawings.

BEST MODES OF CARRYING OUT THE INVENTION

Figure 1:
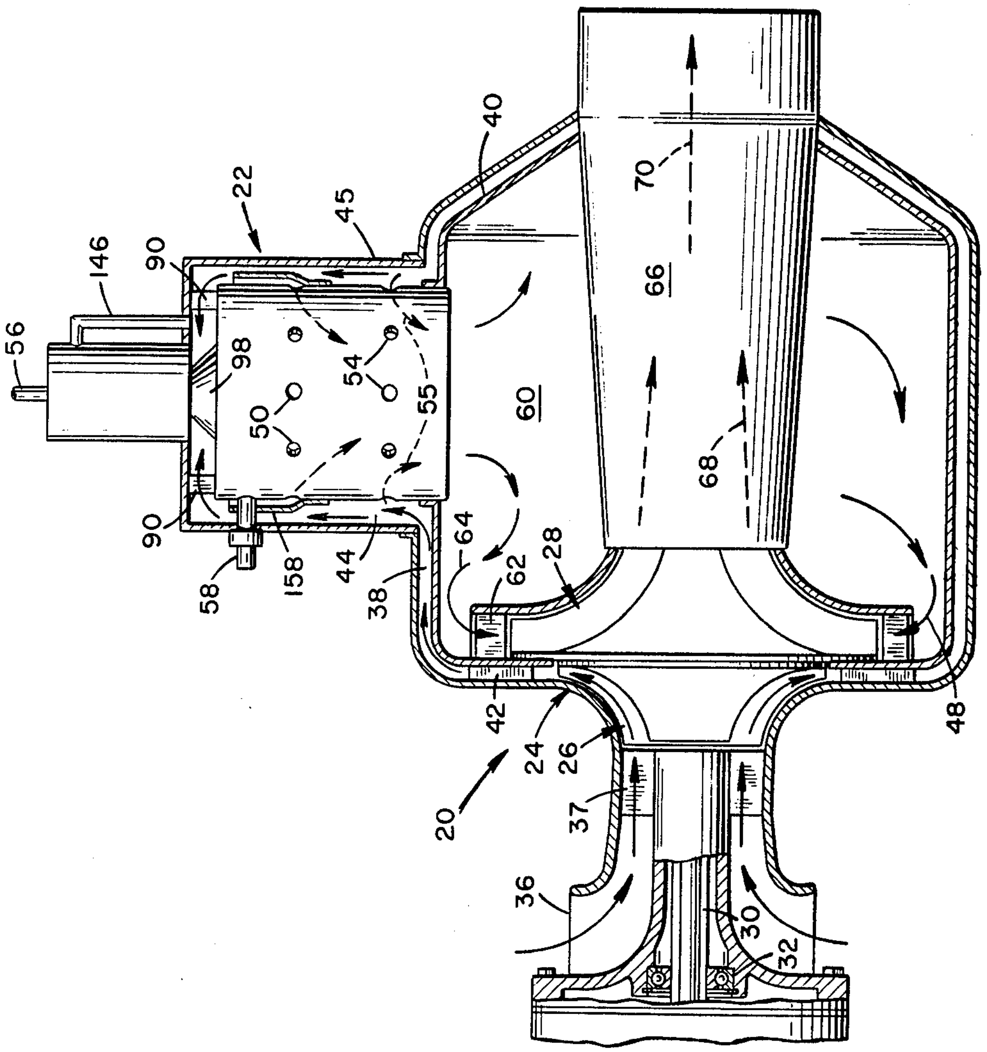
FIG. 1 is a longitudinal section through a gas turbine engine having a combustor that may be equipped with liquid fuel supply and atomizing systems embodying the principles of the present invention.

Referring now to the drawing, FIG. 1 depicts a gas turbine engine 20 equipped with a combustor 22 that can be equipped with rotating cup atomizers constructed in accord with and embodying the principles of the present invention.

Engine 20 is a commercially available, Solar Turbines International Gemini. It will, accordingly, be described herein only to the extent necessary for an understanding of the present invention.

Engine 20 includes a casing 24 housing a single stage radial compressor 26 and a radial, single stage turbine 28 mounted in back-to-back relationship on shaft 30. The compressor-turbine-shaft assembly is rotatably supported in casing 24 by bearings 32 (only one of which is shown).

Combustor 22 is supported from casing 24 on the downstream side of turbine 28.

Air enters casing 24 through an annular inlet 36 at its upstream end and flows in an axial direction past vanes 37 into compressor 26.

The compressor discharges the air through a passage 38 between casing 24 and an inner jacket 40 past diffuser vanes 42 into an annular passage 44 between combustor casing 24 and combustor jacket 45. Part of this air flows into the main combustion air passage 46 of combustor 22 (see FIG. 2) as indicated by arrows 48, and additional air is introduced into the combustor through secondary or dilution air ports 50 as indicated by arrows 52 to dilute the hot combusted gases to acceptable temperatures when air in more-or-less sufficient quantities for complete combustion is supplied through the main combustion air passage. Where insufficient air for complete combustion is supplied through that passage additional air in an amount sufficient to complete combustion is supplied through air ports 54 further downstream as indicated by arrows 55 to dilute the combustion products.

Air supplied to the combustor in the manner just described is also employed to cool those combustor components which are susceptible to overheating.

Fuel is supplied to the engine through line 56, and an ignitor 58 is provided to ignite the fuel at light-off.

Thereafter, the combustor operates as described above.

The hot gases generated in combustor 22 are discharged into an annular plenum 60 and flow from the plenum through nozzle ring 62 into turbine 28 to drive the latter as indicated by arrows 64.

Gases discharged from the turbine are exhausted through a manifold 66 as indicated by arrows 68 and 70.

By virtue of the foregoing, turbine 28 drives compressor 26 and, in addition, generates additional energy which is available at shaft 30.

Figure 2:
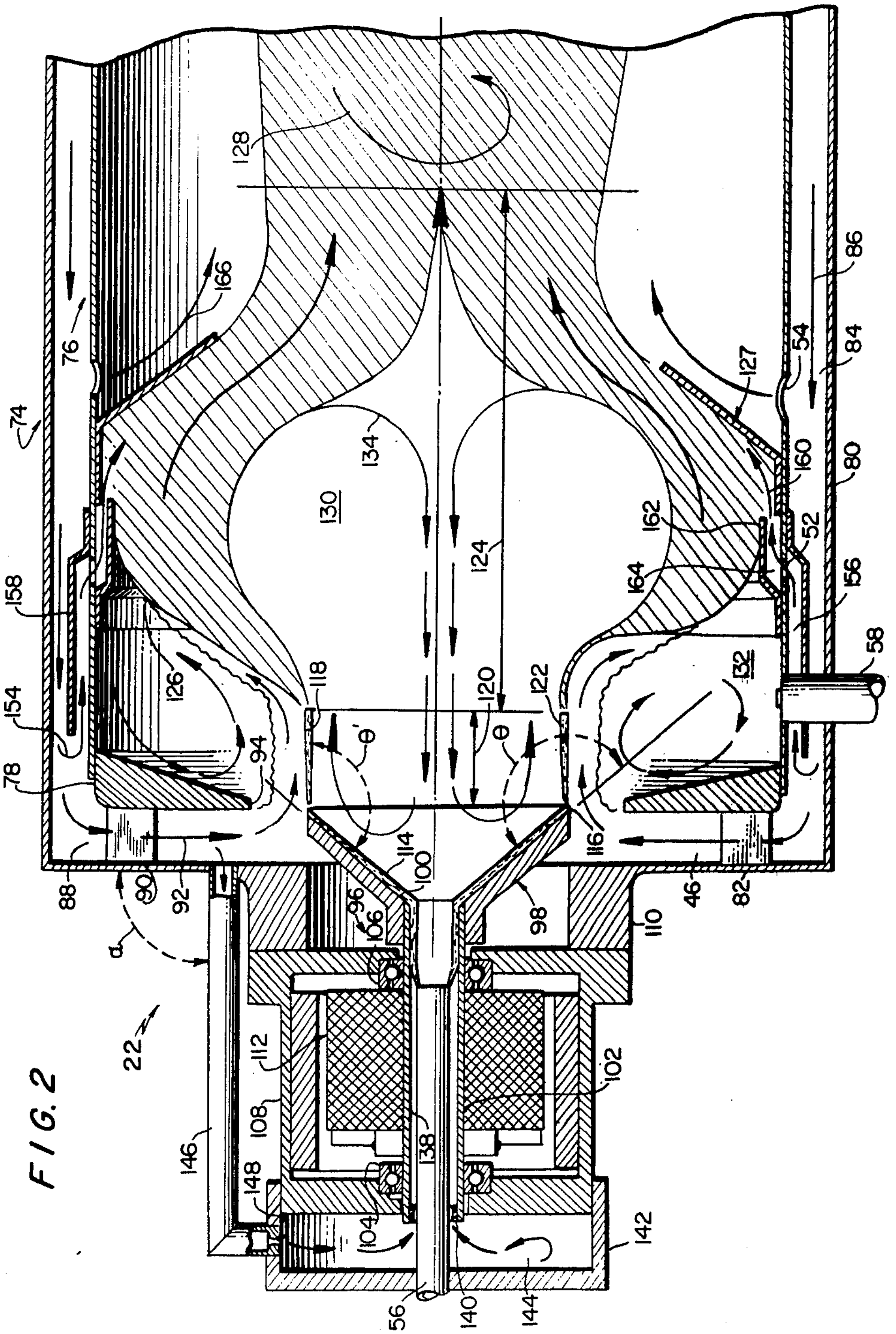
FIG. 2 is a longitudinal section through the combustor of the gas turbine engine shown in FIG. 1.

Referring now to FIG. 2 of the drawing, combustor 22 numbers, among its major components, a jacket or outer casing 74, an inner casing 76, and a dome 78.

Outer casing 74 has a longitudinally extending cylindrical section 80 with a transversely extending wall 82 at its upstream end.

Inner casing 76 is a cylindrical member supported in concentric relationship in the cylindrical section 80 of the outer casing.

Dome 78 is a circular component and is mounted in the upstream end of the inner casing. It cooperates with the upstream end wall 82 of outer casing 74 to form the radially inwardly extending, main combustion air passage 46 alluded to briefly above. In combustor 22, air reaches that passage from an axially extending, annular passage 84 between inner combustor casing 76 and the cylindrical section 80 of the outer casing as indicated by arrows 86.

Disposed in main combustion air passage 46 adjacent its inlet 88, and extending between outer casing end wall 82 and dome 78, is a set of radially oriented, generally equiangularly spaced, longitudinally extending swirl vanes 90. The latter impart a rotational component to combustion air introduced into passage 46 through inlet 88 and flowing therethrough as indicated by arrows 92.

The combustion air is discharged from passage 46 through a sharp edged orifice 94 in dome 78 in the form of a swirling, or rotating, axially moving annulus of combustion air.

Fuel supplied to combustor 22 through line 56 is discharged into a rotating cup type atomizer 96. The atomizer includes a cup 98 with a frustoconical inner face 100 facing the downstream end of the combustor and a hollow shaft 102 on which the cup is mounted.

Shaft 102 surrounds fuel line 56. It is rotatably supported by bearings 104 and 106 in a casing 108 secured to an annular flange or boss 110 on outer combustor casing end wall 82.

Shaft 102 and cup 98 are rotated by an electric motor 112.

Fuel introduced into the combustor through line 56 is consequently spread into a thin, uniform film 114 on the inner face 100 of cup 98 and discharged from the periphery or downstream edge 116 of the latter at a location axially more or less coincident with orifice 94 as an annulus of fine droplets of controlled size. The fuel supplied to the combustor is accordingly placed in atomized form on the inner boundary 118 of the swirling annulus of combustion air at a precisely determinable location.

Extending downstream from rotary cup 98 is a flame stratification zone 120 in which the atomized fuel in annulus 122 is vaporized. At the downstream end of flame stratification zone 120, the swirling or rotating, stratified annuli of combustion air and swirling vaporized fuel are rapidly expanded into a combustion zone 124 as indicated by streamline 126.

The swirling fuel-air mass expands outwardly as it moves downstream through the combustion zone to an extent limited by the downstream section of inner combustor casing 76. Further downstream, the swirling or rotating gases are caused to contract inwardly by an annular, frustoconical baffle 127 which tapers inwardly and toward the downstream end of the combustor and is secured in inner combustor casing 76.

The annulus of swirling, hot gases ceases to exist as such at the downstream end of the combustion zone 124 although the rotational swirl of the gases continues as indicated by arrow 128.

The aerodynamic flow mechanism just described results in the creation of an inner recirculation zone 130, which is the main flame stabilizing mechanism in combustor 22 and an annular, outer recirculation zone 132 which surrounds the swirling annulus of combustion air at the upstream end of the combustor. Hot gases flowing upstream in the inner recirculation zone 130 as indicated by arrows 134 ignite atomized fuel in flame stratification zone 120. However, because mixing of the hot fuel and the cooler combustion air surrounding it is strongly inhibited by centrifugal force effects, only a small percentage of this fuel can be burned in the flame stratification zone. Nevertheless, this limited combustion is sufficient to evaporate the remainder of the atomized fuel and raise it to a very high temperature.

Downstream from flame stratification zone 120, the bulk of the fuel burns in combustion zone 124. The combusted fuel-air mixture supplies the hot gases necessary for ignition to the inner recirculation zone 130 and to the outer recirculation zone 132.

In a rotary cup atomizer as shown in FIG. 2, fuel can back up through the passage (138 in FIG. 2) between the fuel supply line and the cup supporting shaft. This is disadvantageous because fuel can consequentially reach the bearings in which the shaft is supported; and the fuel has a definite deleterious effect on the bearings.

In combustor 22 this back up of fuel is forestalled by installing a close tolerance seal 140 between the upstream end of shaft 102 and the fuel delivery line.

Fuel back up is further minimized by the air buffer arrangement shown in FIG. 2. This includes a cap 142 which cooperates with casing 108 to form a plenum 144 on the upstream side of atomizer shaft 102 and an air line or duct 146 connecting primary combustion air passage 46 with plenum 144 through a discharge orifice 148.

The arrangement just described more or less balances the pressure in plenum 144 with that in combustor 22. As a consequence, fuel is prevented from backing up through passage 138.

As indicated above, additional air needed to complete the combustion processes or to dilute the combustion products to an appropriate temperature can be supplied to the interior of combustor 22 through secondary or dilution air ports 50. More particularly, as suggested by arrows 86, this air is caused to flow upstream through annular passage 84 like that supplied through radial swirl passage 46. The secondary, or dilution, air then flows, as indicated by arrows 154, into an annular passage 156 surrounding the upstream part of inner combustor casing 76. Passage 156 is formed by the cooperation between casing 76 and an annular air flow guide 158 which surrounds the inner casing and is fixed to the latter on the downstream side of the secondary air ports.

As the secondary air flows into the combustor, it is directed along the swirl flow contracting baffle or deflector 127 as indicated by arrows 160 by an annular flow guide 162. This component abuts the inner combustor casing on the upstream side of the dilution air ports and cooperates with the latter to form an annular flow passage 164 opening onto the interior of the combustor at its downstream end. Consequently, in addition to performing the functions described above, the air introduced through secondary ports 50 provides film cooling of deflector 127 and keeps it from overheating.

The ports 54 for additional tertiary air are also illustrated in FIG. 2. Air is, again, supplied to the interior of the combustor through these ports from annular flow passage 84.

As indicated by arrows 166, baffle or deflector 127 performs an additional important function with respect to the tertiary air in that it deflects that air away from, and keeps it from entering, inner recirculation zone 130.

Figure 3:
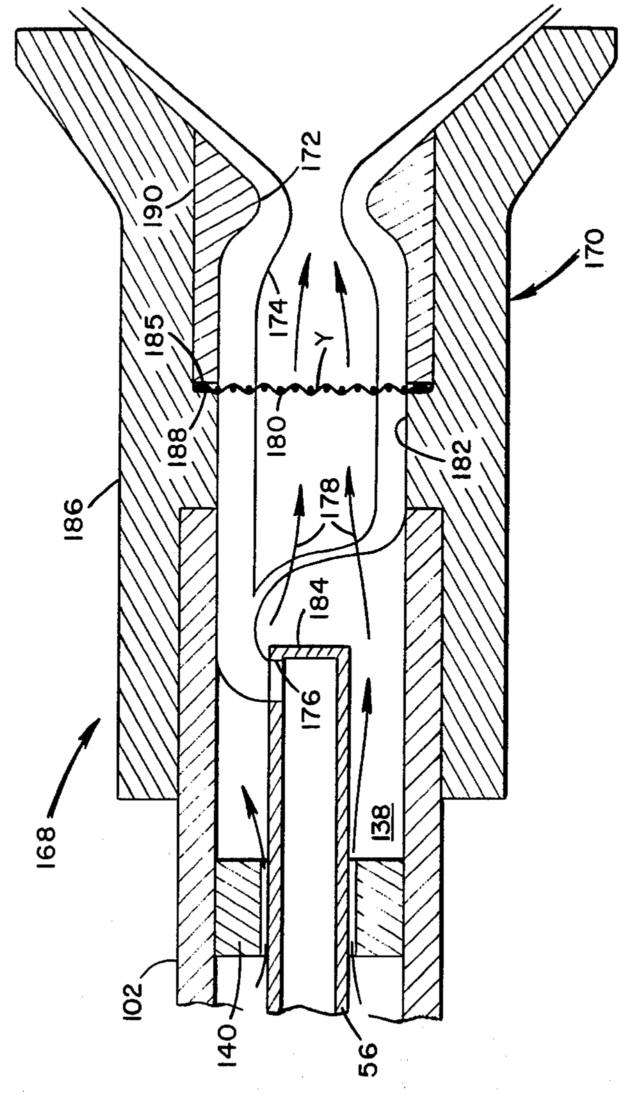
FIG. 3 is a longitudinal section through a rotating cup liquid fuel atomizer and the components of a liquid fuel supply system associated therewith, all constructed in accord with the principles of the present invention.

Referring still to the drawing, a combustor in accord with the principles of the present invention can be gotten by substituting an atomizer 168 with a rotary atomizer cup of the character shown in FIG. 3 and identified by reference character 170 for the cup 98 illustrated in FIG. 2.

Atomizer cup 170 differs from cup 98 in one respect by virtue of an inwardly extending lip or dam 172 at the frustum or upstream end of its inner cup face 100.

This dam maintains a reservoir 174 of fuel in the atomizer cup. This is important because it contributes to the uniformity of fuel film 114 and because it makes fuel available during transient conditions, eliminating the small, trouble prone, minimum flow orifice otherwise required to keep fuel flowing to the atomizer along with the tendency to plugging and other attendant problems of such orifice. Specifically, when the load is removed from a gas turbine engine, the fuel flow must be rapidly reduced to prevent overspeed; and the just mentioned minimum flow orifice is provided in the typical fuel control for this purpose. The creation of the fuel reservoir in the cup in accord with the present invention makes this orifice unnecessary because sufficient fuel can be supplied from it to keep the flame burning even though the supply of fuel to the atomizer is briefly interrupted in the circumstances just described. Also, the fuel is good insulation, and it keeps the atomizer cup 170 from overheating during the operation of the combustor in which the atomizer is incorporated.

Referring still to FIG. 3, I discussed above a novel air buffer arrangement for keeping fuel from backing up through rotary cup atomizers such as that shown in FIG. 2.

In gas turbine engine applications that arrangement results in an air pressure in plenum 144 that is slightly higher than the air pressure inside the combustor 22 at light-off conditions of the turbine engine 20. This pressure gradient increases substantially in normal engine operation due to the increase in air pressure and mass flow rate.

This pressure gradient encourages a flow of air through passage 138 from plenum 144 into the inside of combustor 22. This flow of air is controlled by the sizing of orifice 148 and by the location of air line or duct 146. Thus location of air line 146 in combustion air passage 46 toward the inner periphery of the free vortex air swirl generated by swirl vanes 90, as shown in FIG. 2, results in a reduced flow of air, further reduced by sizing down orifice 148. Location of the air line 146 radially outward results in an increase in air flow. This effect of the radial position of air line 146 on air flow is a consequence of the fact that, in a free vortex air flow, the static pressure is proportionate to the radius of rotation. As a result of this air flow through passage 138 the fuel is prevented from backing up through that passage as discussed above.

Experience has shown that, to prevent fuel back up through passage 138, the flow of air through passage 138 can be substantial enough, under the conditions of highest air flow at normal engine operation, to disturb the fuel film on occasion and to penetrate into the inner recirculation zone 130 in the combustor. As pointed out previously, both of the foregoing states of operation are unwanted because of the appurtenant problems such as engine instability and surge, flame instability, generation of smoke, etc.

I have now found that the problems engendered by higher rates-of-flow of the buffer air can be minimized, if not eliminated entirely, by injecting the fuel into the rotating atomizer cup 170 at low velocity and pressure through an orifice 176 located at or near the downstream or delivery end of fuel line 56. In consequence the buffer air, as shown by arrows 178 in FIG. 3, flows through the fuel emanating from orifice 176 and, with the reduced velocity this results in, through hollow shaft 102 into the combustor. At the reduced velocity the buffer air is not apt to disturb the liquid fuel film 114 or to penetrate into the inner recirculation zone 130 of the combustor.

Nevertheless, provision is preferably made in atomizer 168 for preventing the flow of fuel droplets generated by disturbance of the liquid fuel film from reaching the combustor. Specifically, such flow of fuel droplets is prevented by installing a screen 180, or other barrier of perforate or porous material, in the hollow bore 182 of rotating cup 170 downstream from the delivery end 184 of fuel line 56.

Screen 180 (which spans bore 182) is positioned against a downstream facing, annular ledge 185 in outer rotating cup component 186. The screen is retained in place by the upstream end 188 of inner cup component 190 which presses the screen against ledge 185 (any suitable scheme can be used to secure inner cup component 190 to the outer component 186 of the cup).

One suitable barrier that has been found satisfactory for the purposes discussed above consists of a fine mesh screen with a wire size of 0.015 inch and openings averaging about 0.040 inch in diameter. Such a screen does not disrupt the fuel film 114 formed on face 100 of atomizer cup 170, and it allows the free flow of air through the screen while preventing any large fuel droplets torn off the fuel film by the action of the air flow from entering the combustor.

The mesh size of the screen is not critical, and other porous and perforate materials serve the same purpose. For example, a wad of fine wire wool has been substituted for the screen and has given equally satisfactory results.

The foregoing text and the accompanying drawings will suggest many other modifications of my invention to those conversant with the relevant arts. To the extent that they are not expressly excluded, those and other applications of the invention's principles are fully intended to be encompassed within the scope of the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What I claim as my invention is:

1. In combination: a combustor having therein a hot gas recirculation zone; means for supplying a liquid fuel to said combustor; and means for supplying combustion air to said combustor, said fuel supplying means comprising a fuel atomizer including a rotatable cup, a hollow shaft, bearings supporting said shaft and cup for rotation about an axis generally coincident with the longitudinal axis of the combustor, means for rotating said shaft and said cup to spread into a thin film on the inner surface of the cup a liquid fuel supplied thereto and to then eject said fuel from the downstream edge of said cup as an annulus composed of fine droplets of controlled size, and means extending through said hollow shaft for delivering fuel to said atomizer, said combination further comprising means for preventing fuel from backing up through the passage between said fuel delivering means and said shaft and consequentially adversely affecting said bearings, said last-mentioned means comprising air passage means communicating with the interior of the hollow shaft at a location upstream from the rotatable cup through which buffer air can flow from the combustor into said shaft to reduce the pressure differential therebetween, and means in said rotatable cup for reducing the velocity of the buffer air flowing through said shaft to keep said air from disturbing the film of fuel formed on said rotatable cup and/or to keep said air from penetrating to said recirculation zone and thereby interfering with the combustion process.

2. A combination as defined in claim 1 wherein said recirculation zone constitutes a region of a combustion zone in said combustor and wherein the means for reducing the velocity of the buffer air flowing through said hollow shaft comprises orifice means in said fuel delivering means toward the downstream end thereof through which said fuel can be so discharged as be intercepted by said buffer air, thereby creating a drag on said air.

3. A combination as defined in either of the preceding claims 1 or 2 which also includes means housed in and extending transversely across said rotatable cup at a location which is downstream from that location at which fuel is discharged from the fuel delivering means for intercepting larger drops of fuel formed upstream of said combustion zone and said thereby keeeping said larger drops from reaching said combustion zone.

4. A combination as defined in claim 3 wherein the means for intercepting said larger drops of fuel comprises a porous or perforate barrier mounted in said cup at a location spaced upstream from that edge of the cup from which the fuel is ejected.

5. The combination of a combustor, means for supplying liquid fuel to said combustor, and means for supplying combustion air thereto, the means for supplying fuel to said combustor comprising a rotary cup type fuel atomizer housed in the upstream portion of the combustor and having an inner surface facing the downstream end of the combustor, a fuel supply passage communicating at its downstream end with said inner surface, means for rotating said cup to spread the fuel supplied through said passage into a film on the inner surface of the cup and to eject the fuel from the edge of said surface as an annulus composed of fuel droplets of controlled size, and means housed in and extending transversely across said cup at a location downstream from the downstream end of the fuel supply passage for intercepting larger drops of fuel and thereby keeping them from reaching said combustion zone and thereby causing engine instability or surge and the means for supplying combustion air to said combustor comprising means forming a radially directed combustion air passage having an annular outlet surrounding said atomizer, means for imparting a rotational component or swirl to air flowing through said passage, and means at the outlet of said passage for creating a vena contracta effect as said swirling air exits from said passage and flows toward the downstream end of said combustor in an annulus surrounding said atomizer, thereby facilitating the placement of the fuel discharged from said atomizer at a precise location along the inner surface of said swirling annulus of combustion air in the form of an annular ring of fuel and providing time for the evaporation of said fuel.

6. A combination as defined in claim 5 wherein the means for intercepting said larger drops of fuel comprises a porous or perforate barrier mounted in said cup at a location spaced upstream from that edge of the cup from which the fuel is ejected.

7. A gas turbine engine comprising: a compressor; a turbine for driving said compressor and for supplying useful mechanical energy; a combustor in fluid communication with the discharge of said compressor for heating air discharged from said compressor and for supplying hot gases to said turbine to drive the latter; means for supplying fuel to the combustor including a rotatable cup, a fuel supply means communicating with the inner face of said cup, means for rotating said cup to spread the fuel supplied through said fuel supply means into a film on the inner face of the cup and to eject the fuel from the edge of said face as an annulus composed of droplets of controlled size, and means housed in an extending transversely across said cup at a location downstream from the downstream end of the fuel supply means for intercepting larger drops of fuel and thereby keeping them from reaching said combustion zone in said combustor and thereby causing engine instability or surge and means for supplying combustion air to said combustor comprising means forming a radially directed combustion air passage having an annular outlet surrounding said atomizer, means for imparting a rotational component or swirl to air flowing through said passage, and means at the outlet of said passage for creating a vena contracta effect as said swirling air exits from said passage and flows toward the downstream end of said combustor in an annulus surrounding said atomizer, thereby facilitating the placement of the fuel discharged from said atomizer at a precise location along the inner surface of said swirling annulus of combustion air in the form of an annular ring of fuel and providing increased time for the evaporation of said fuel.

8. A gas turbine engine as defined in claim 7 wherein the means for intercepting said larger drops of fuel comprises a porous or perforate barrier mounted in said rotatable cup at a location spaced upstream from that edge of the cup from which the fuel is ejected.

9. A gas turbine engine comprising: a compressor; a turbine for driving said compressor and for supplying useful mechanical energy; a combustor in fluid communication with the discharge side of said compressor for heating air discharged from said compressor and for supplying hot gases to said turbine to drive the latter, said combustor having a recirculation zone therein; means for supplying fuel to the combustor comprising a fuel atomizer including a rotatable cup, a hollow shaft, bearings supporting said shaft and cup for rotation about an axis generally coincident with the longitudinal axis of the combustor, means for rotating said shaft and said cup to spread into a thin film on the inner surface of the cup a liquid fuel supplied thereto and to then eject said fuel from the downstream edge of said cup as an annulus composed of fine droplets of controlled size, and means extending through said hollow shaft for delivering fuel to said atomizer, said combination further comprising means for preventing fuel from backing up through the passage between said fuel delivering means and said shaft and consequentially adversely affecting said bearings, said last-mentioned means comprising air passage means communicating with the interior of the hollow shaft at a location upstream from the rotatable cup through which buffer air can flow from the combustor into said shaft to reduce the pressure defferential therebetween, and means in said rotatable cup for reducing the velocity of the buffer air flowing through said shaft to keep said air from disturbing the film of fuel formed on said rotatable cup and/or to keep said air from penetrating to said recirculation zone and thereby interfering with the combustion process.

10. A gas turbine engine as defined in claim 9 wherein said recirculation zone constitutes a region of a combustion zone in said combustor and wherein the means for reducing the velocity of the buffer air flowing through said hollow shaft comprises orifice means in said fuel delivering means toward the downstream end thereof through which said fuel can be so discharged as be intercepted by said buffer air, thereby creating a drag on said air.

11. A gas turbine engine as defined in either of the preceding claims 9 or 10 which also includes means housed in and extending transversely across said rotatable cup at a location which is downstream from that location at which fuel is discharged from the fuel delivering means for intercepting larger drops of fuel formed upstream of said combustion zone and thereby keeping said larger drops from reaching said combustion zone.

12. A gas turbine engine as defined in claim 11 wherein the means for intercepting said larger drops of fuel comprises a porous or perforate barrier mounted in said cup at a location spaced upstream from that edge of the cup from which the fuel is ejected.

13. A gas turbine engine as defined in either of the preceding claims 7 or 9 which includes means for forming the compressor discharge air into a swirling annulus toward the upstream end of said combustor and wherein the rotary atomizer cup is so designed and located with respect to the upstream end of said combustor that the annulus of fuel droplets is formed on the inner boundary of said annulus of combustion air.

* * * * *

UNITED STATES PATENT AND TRADEMARK OFFICE
CERTIFICATE OF CORRECTION

PATENT NO. : 4,478,045

DATED : October 23, 1984

INVENTOR(S) : Jack R. Shekleton

It is certified that error appears in the above-identified patent and that said Letters Patent is hereby corrected as shown below:

Column 8, Line 48, "said" (second occurrence) should be cancelled.

Column 9, Line 37, "an" should be --and--.

Column 10, Line 27, "defferential" should be --differential--.

Signed and Sealed this

*Fifth* Day of *November 1985*

[SEAL]

*Attest:*

DONALD J. QUIGG

*Attesting Officer*

*Commissioner of Patents and Trademarks*